(12) United States Patent
Nguyen

(10) Patent No.: US 9,196,171 B2
(45) Date of Patent: Nov. 24, 2015

(54) 3JCN MUSIC NOTATION

(71) Applicant: Thomas Nguyen, San Diego, CA (US)

(72) Inventor: Thomas Nguyen, San Diego, CA (US)

( * ) Notice: Subject to any disclaimer, the term of this patent is extended or adjusted under 35 U.S.C. 154(b) by 0 days.

(21) Appl. No.: 13/911,981

(22) Filed: Jun. 6, 2013

(65) Prior Publication Data

US 2014/0360339 A1    Dec. 11, 2014

(51) Int. Cl.
     *G09B 15/02*      (2006.01)

(52) U.S. Cl.
     CPC ..................... *G09B 15/026* (2013.01)

(58) Field of Classification Search
     USPC ............. 84/483.2, 477, 478, 482, 483.1, 484, 84/485, 486
     See application file for complete search history.

(56) References Cited

U.S. PATENT DOCUMENTS

| | | | | |
|---|---|---|---|---|
| 4,794,838 A * | 1/1989 | Corrigau, III | .................. | 84/600 |
| 5,202,526 A * | 4/1993 | Ohya | ................ | 84/462 |
| 5,962,800 A * | 10/1999 | Johnson | ............... | G09B 15/006 |
| | | | | 84/423 R |
| 6,313,387 B1 * | 11/2001 | Yamauchi | ............. | G09B 15/04 |
| | | | | 84/477 R |
| 7,439,438 B2 * | 10/2008 | Hao | ................... | G09B 15/004 |
| | | | | 84/470 R |
| 7,674,965 B2 * | 3/2010 | Mataele | ....................... | 84/483.2 |
| 7,687,702 B2 * | 3/2010 | Chu | ................ | 84/476 |
| 8,158,869 B2 * | 4/2012 | Charles | ...................... | 84/477 R |
| 2004/0020347 A1 * | 2/2004 | McIntosh | ................... | 84/477 R |
| 2008/0072738 A1 * | 3/2008 | Plamondon et al. | ........ | 84/423 R |
| 2008/0141848 A1 * | 6/2008 | Weitz | ........................... | 84/483.1 |
| 2008/0141849 A1 * | 6/2008 | Johnston | ..................... | 84/483.2 |
| 2008/0295670 A9 * | 12/2008 | Egan | ........................ | 84/483.2 |
| 2010/0288105 A1 * | 11/2010 | Rose | ............................ | 84/483.2 |

\* cited by examiner

*Primary Examiner* — Christopher Uhlir

(57) ABSTRACT

There is no staff in 3JCN Music Notation. Therefore, 3JCN Music Notation is very simple compare to Western Notation. A note in 3JCN Music Notation is represented by a lower case letter for the pitch class (a through g), preceded by the note's octave (1 through 11) and followed by the note's duration (a real number). For example, 6c1 is for note "c" in 6$^{th}$ octave (middle C) with 1 unit of duration.

14 Claims, 8 Drawing Sheets

HAPPY BIRTHDAY
American Folk Song

Moderato     3/4

| 6c.5 | 6c.5 | ‖ | 6d1 | 6c1 | 6f1 | \| | 6e2 |
|---|---|---|---|---|---|---|---|
| Hap | - py | | Birth | - day | to | | you |

| 6c.5 | 6c.5 | \| | 6d1 | 6c1 | 6g1 | \| | 6f2 |
|---|---|---|---|---|---|---|---|
| Hap | - py | | Birth | - day | to | | you |

| 6c.5 | 6c.5 | \| | 7c1 | 6g1 | 6f1 | \| | 6e1 | 6d2 |
|---|---|---|---|---|---|---|---|---|
| Hap | - py | | Birth | - day | to | | my | dear |

| -6b.5 | 6b.5 | 6a1 | 6f1 | \| | 6g1 | 6f2 | \| | 6f3 | ‖ |
|---|---|---|---|---|---|---|---|---|---|
| Hap | - py | Birth | - day | | to | you | | | |

FIG. 2

MUSICAL WORDS FOR TEMPO

Before the metronome, words were the only one to describe the tempo of a composition. After the metronome's invention, these words continued to be used. In classical music it is customary to describe the tempo of a piece by one or more words. Most of these words are Italian as the follows:

| | | |
|---|---|---|
| Larghissimo | very, very slow | < 19 bpm |
| Grave | slow and solemn | 20-40 |
| Lento | slowly | 40-45 |
| Largo | broadly | 45-50 |
| Larghetto | rather broadly | 50-55 |
| Adagio | slow and stately | 55-65 |
| adagietto | rather slow | 65-69 |
| Andante moderato | a bit slower than andante | 69-72 |
| Andante | at walking pace | 73-77 |
| Andantino | slightly faster than andante | 78-83 |
| Marcia moderato | moderately, march | 83-85 |
| Moderato | moderately | 86-97 |
| Allegretto | moderately quick | 98-109 |
| Allegro | fast, quick and bright | 109-132 |
| Vivace | lively and fast | 132-140 |
| Vivacissimo | very fast and lively | 140-150 |
| Presto | very fast | 168-177 |
| Prestissimo | extremely fast | >178 |

FIG. 3

TIME SIGNATURE

Time signature (n/d) is used to specify how many beats are in each measure (numerator) and what note duration units constitutes one beat (4 units/denominator):

For example: time signature 3/4 means there are 3 beats in each measure (numerator is 3) and 1 unit is equivalent with one beat (since 4 units/4 = 1 unit)

For time signatures with numerators 6, 9, 12,...divide numerator by 3 to find number of beats in each measure and do:
(3*4 units/denominator) to find what units is equivalent with one beat.

For example: time signature 6/8 means there are 2 beats in each measure (6/3 = 2) and 1.5 units is equivalent with one beat (3*4/8 = 1.5)

Other cases: 5/4 = 2/4 + 3/4  or  7/4 = 3/4 + 4/4 ...

FIG. 4

KEY SIGNATURE

Key signature is a series of plus + (or sharp #) or minus - (or flat b), designating notes that are consistently play one semitone higher or lower than the equivalent natural notes unless otherwise altered with a natural accidental "o":

Plus/Sharp:   [ + f, c, g, d, a, e, b ]

Minus/Flat:   [ - b, e, a, d, g, c, f ]

FIG. 5

SONG FROM A SECRET GARDEN

Tempo=56   4/4   [-b, e, a ]

3JCN MUSIC NOTATION

BACKGROUND OF THE INVENTION

The standard system of music notation is an indirect system to represent music notes. It needs tremendous efforts to describe music. First of all, it uses an upper (or treble) clef and a lower (or bass) clef. Each clef has five parallel horizontal lines (called staff). Each line and intervening space represents a specific note's name on the A-G scale. So in order to know the note's name, students have to remember its position on the staff and type of clef, treble clef or bass clef. If a note does not locate inside the staff, then supplemental spaced lines must be added above or below the staff (called ledger lines). Students then can determine the note's name with reference to the number of added lines.

That is just for determining the note's name. How to determine the note's duration (the length of a note)? A bunch of oval note symbols are used for that. For example, an unshaded oval note alone denotes a whole note. If a whole note has a vertical stem line attached with it, then it becomes a half-note. If a half-note is solidly shaded, then it becomes a quarter-note. Notes of shorter than duration of a quarter-note are indicated as for quarter-notes, but with one or more angled lines marked on the stem lines, with each angled lines indicating that the note length is to be half of what it would have been without the angled line. An eighth-note looks like a quarter-note with one angled line of the stem. A sixteenth-note looks like a quarter-note with two angled lines of the stem, and so on. But that is not all for determining duration of a note, the standard system of music notation uses a dot to the right of the note, indicating that the note is now to have a duration 50% greater than its original duration. For example, a quarter-note with a dot has duration equal to one-and-a-half quarter-notes.

The standard system of music notation has another convention relate to the duration of a note in complicated ways. That is tuplet. A tuplet is any rhythm that involves dividing the beat into a different number of equal subdivisions from that usually permitted by the time signature. The most common tuplet is the triplet. Whereas normally two quarter-notes are the same duration as a half-note, but three triple quarter notes total that same duration. So the duration of a triplet quarter note is ⅔ of a standard quarter note. Similarly, three triplet eighth notes are equal in duration to one quarter note. If several note values appear under the triple bracket, they are all affected the same way, reduced to ⅔ their original duration. The triple indication may also apply to notes of different values, for example a quarter note followed by one eighth note, in which case the quarter note may be regarded as two triplet eighths tied together. Beside triplets, the standard system of music notation also has duplets (2), quintuplets (5), sextuplets (6), septuplets (7), etc.

As preceding examples illustrate, the standard system of music notation is a complicated indirect system for determining note name and note duration, thus giving new students so many things to remember as they start to learn to read music. That makes a lot of new students feel learning music is difficult and they give it up very soon.

There is a need for a new music notation system that is easier to read and learn. In particular, there is a need for a music notation system that simpler and less abstract than the standard music notation system. In order to do that there is a need to eliminate its middle conventions such clef, staff, oval, ledger line, stem line, angled line, a dot, tuplet, etc. There is a yet further need for a music notation system that provides a direct visual representation of note's name and note's duration, thus eliminating the need to interpret note indication in accordance with non-institutive convention in order to know note's name and to determine how long the indicated note are to be held. The present invention is directed to these needs.

BRIEF SUMMARY OF THE INVENTION

In general terms, the present invention (3JCN music notation; 3JCN stands for Jennifer James John Calina Nguyen; Four children of author Thomas Nguyen) is an alternative of the standard system of music notation (or Western music notation). 3JCN music notation does not use a staff.

The most important invention of 3JCN music notation is the way to represent a music note: A note is represented by a lower case letter for the pitch class (a through g), preceded by the note's octave (1 through 11) and followed by the note's duration (or length). For example, 6c1 is for note "c" in $6^{th}$ octave (middle C) with 1 unit of duration.

The first two symbols "6c" locate the position of the note. This invention eliminates all back bones of Western music notation: Those are staff, clef, and ledger line. As a consequence, the grand staff of piano music of Western music notation has been eliminated. There are no more treble clef and bass clef. In 3JCN system, two musical lines for piano have the same identical formation. The brace at the far left side to joint treble clef and bass clef in Western is placed by an open square bracket (FIG. 1).

The last number "1" shows the duration of the note is 1 unit. I am going to talk about "unit" later (at Time Signature), for now, 1 unit can be understood as the duration of one quarter note of the standard system. This last number helps to get rid of Western's oval shape, stem, angled line, a dot, and tuplet. Moreover, it is easy to add all durations of notes in each measure to make sure no writing mistakes, So the presentation of musical note of 3JCN music notation actually cleans up all the complicated foregoing discussions of Western music notation.

When students look into a 3JCN music sheet (FIG. 2), they can read note names and know how to find these notes on their instruments easily.

As we know, there are 128 notes in the standard MIDI which can divide into 11 octaves. In Western music notation the order of octaves is from −1 to 9. It's not normal to count things start from −1. So in 3JCN music notation octaves' orders are from $1^{st}$ to $11^{th}$.

When we look at the keyboard of a piano, we see the repeat of a pattern of a group of 7 white keys and 5 black keys. The first key in the group is "c" and the last key is "b".

Therefore in 3JCN music notation system, an octave starts from "c", not from "a" like Western music notation.

Others important components of 3JCN music notation system:

3JCN music notation uses one information line on top of the first musical line of the song to show tempo, time signature, and key signature of the piece (FIG. 2).

Tempo is the speed or pace of a given piece or song. Words or numbers can be used for Tempo. For example, bpm=100 (100 beats per a minute or "Moderato" (FIG. 3).

Time Signature specifies how many beats are in each measure (a measure is a part of musical piece which lies between two vertical bars) and what note value constitutes one beat. Time signature helps to transform duration units into beats (FIG. 4).

Key signature is a series of plus + (also called sharp ♯) or minus − (also called flat ♭), designating notes that are consistently play one semitone higher or lower than the equivalent natural notes unless otherwise altered with a natural accidental "o" (FIG. 5).

BRIEF DESCRIPTION OF THE DRAWINGS

Embodiments of the present invention will now be described with reference to the accompanying figures, in which numerical references denote like parts, and in which:

FIG. 2 illustrates one example of a modern song written with 3JCN music notation system.

FIG. 3 illustrates the list of tempo words.

FIG. 4 illustrates different time signatures in conjunction with units and beats.

FIG. 5 illustrates key signatures

Figure 8:
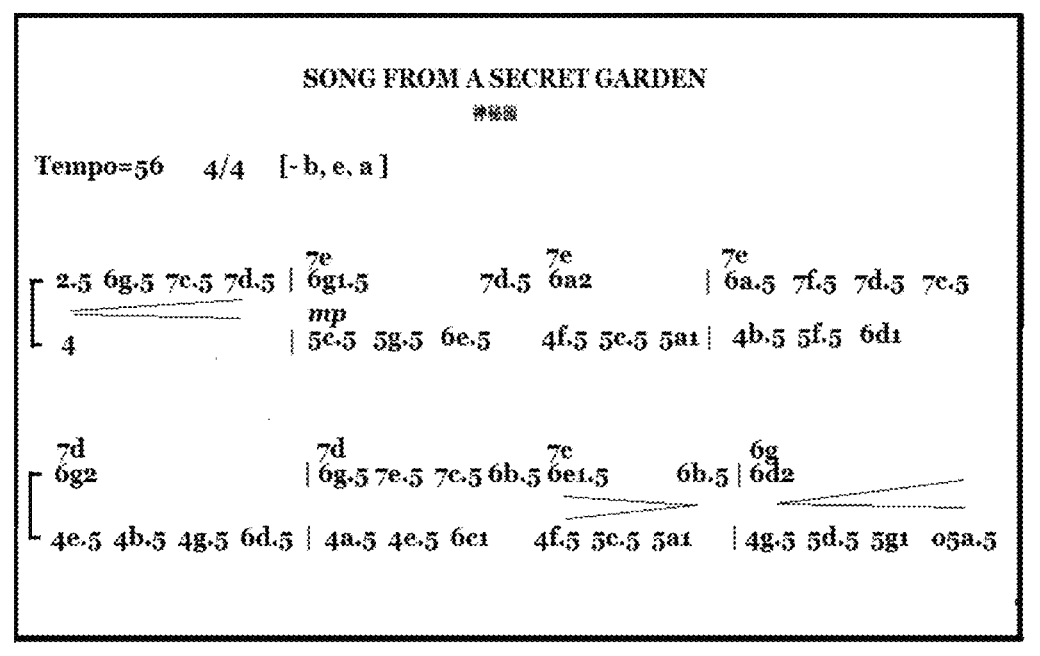

FIG. 8 illustrates example of a piece of classical music for piano.

DETAILED DESCRIPTION OF THE PREFERRED EMBODIMENT

Figure 1:
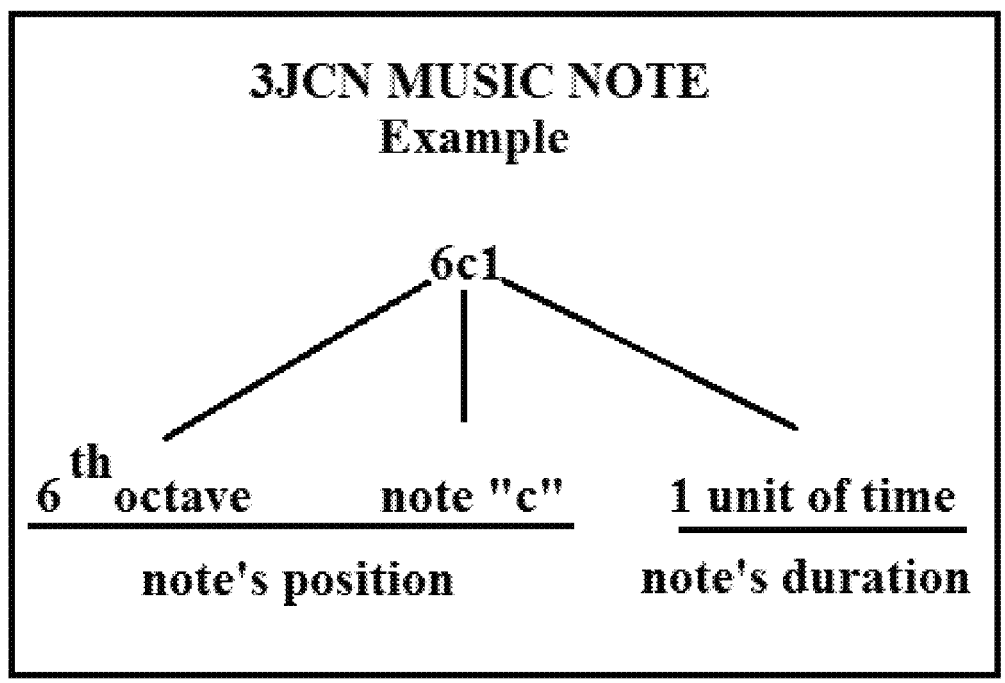
FIG. 1 illustrates components of a musical note in 3JCN music notation system.

In the preferred embodiment, the music notation system of the present invention (3JCN system) uses two numbers and a lower case letter in middle to present a note. In other words, a note is represented by a lower case letter for the pitch class (a through g), preceded by the note's octave (1 through 11) and followed by the note's duration (or length). For example, 6c1 is for note "c" in $6^{th}$ octave (also called middle C, since 6 is the middle of 11 octaves) with 1 unit of duration (FIG. 1). The first part "6c" determines the note position on the musical instrument. For example, "6c" is the middle C on piano; "6c: is located on $5^{th}$ string, $3^{rd}$ fret; etc. The second part "1" shows that not "6c" has a duration of 1 beat for time signature with denominator 4 (FIG. 4)

Besides the name of music piece or song, composer's names, there are three important parts of a music piece: The information line to show information about tempo, time signature, and key signature of the music piece; the main body of music piece consist of many music lines, each line consists of many measures, each measure consist of several notes so that sum of all note duration units must equal to the numerator of the time signature; music line's supports consists of chords, dynamic, special symbols, and special words (FIG. 2)

In musical notation, a measure (or a bar) is a segment of time corresponding to a specific number of beats in which each beat is represented by a particular note value and the boundaries of the bar are indicated by vertical bar lines;

For piano, there are two music lines connected by an open square bracket on the left side. Above line is for right hand and below line is for left hand (FIG. 8).

FIG. 3 shows a list of common Italian tempo words for a composition on the first column; their meanings are in the second column; and their equivalent beats per minute are on the third column.

For simple time signatures (numerator is 2 or 3 or 4), divide 4 units by denominator, we will know what note value constitutes one beat. For example, for time signature ¾, note duration 1 unit is equivalent with one beat (since 4 units/4=1 unit as one beat). There are 3 beats in each measure (since numerator is 3); for time signature 2/2, note duration 2 units is equivalent with one beat (since 4 units/2=2 units as one beat). There are 2 beats in each measure (since numerator is 2). For complex time signature (numerator is 6, 9, 12, . . . ) then we divide numerator by 3 to find number of beats in each measure. Divide 4 units by denominator then multiply the result by 3 to have one beat. For example, for time signature 6/8, 1.5 units will be one beat (since 4 units/8=0.5 units; 0.5*3=1.5 units as one beat) and there are 2 beats in each measure (since 6/3=2). Other cases such 5/4 or 7/4 time signatures, we split these fractions to simpler fractions: 5/4=2/4+3/4 and 7/4=3/4+4/4 (FIG. 4).

FIG. 5 shows two types of key signature: plus + (or sharp ♯) and minus − (or flat b). Plus key signature start with note "f", the second plus note will be a perfect fifth of "f", that is "c"; the next one will be a perfect fifth of "c", that is "g"; and so on:

[+f,c,g,d,a,e,b]~[♯f,c,g,d,a,e,b]

For example, a song with key signature [+f, c, g] means all notes "f, c, and g" are increased one semitone (in piano keys f, c, and g become black keys on their right side).

If we go backward from above list, we have minus key signature:

[−b,e,a,d,g,c,f]~[bb,e,a,d,g,c,f]

For example, a song with key signature [−b, e] means all notes "b and e" are decreased one semitone (in piano, keys b and e become black keys on their left).

Figure 6:
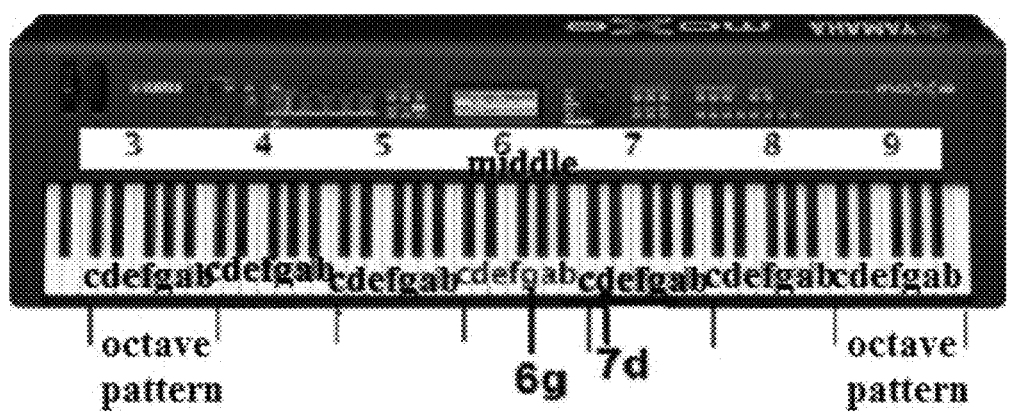
FIG. 6 illustrates example of a piano and its note positions.

FIG. 6 shows notes on a keyboard with 7 octaves. Middle octave is $6^{th}$ octave. It's so easy to locate a note. For example, note 7g1 is note g in $7^{th}$ octave.

Figure 7:
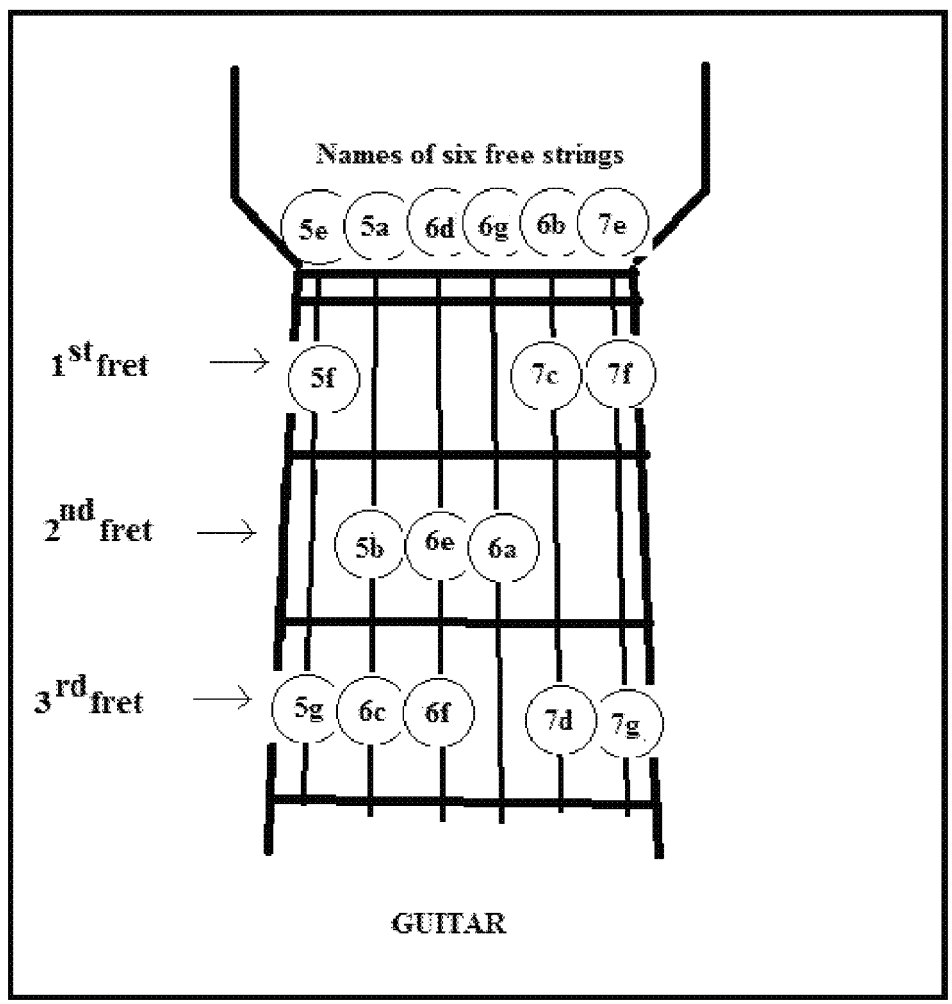
FIG. 7 illustrates example of a guitar and its note positions on the first three frets.

FIG. 7 shows notes on first three frets of a guitar.

For teaching purposes in particular, the 3JCN system could be used to teach music for any musical instruments, in conjunction with a picture of designed instrument and notes on it (FIG. 6 & FIG. 7). Students will remember note positions as they look at the picture and practice. Students can also mark note positions direct on their instruments if it's possible, for learning purpose only.

What is claimed is:

1. A method of notating music piece consisting of:
   (a) A line on the to of a first musical line of a song, which is called an information line, consisting of tempo, time signature, and key signature;
   (b) body of music piece consisting of horizontal musical lines divided into measures, said horizontal musical lines do not have the appearance of a traditional bass clef or a traditional treble clef;
   (c) musical line's supports to indicate sound intensity, chords, dynamics, and symbols;
   (d) music note consisting of a lower case letter a through g for a musical note, preceded by a positive integer 1 through 11 representing the note's octave and followed by a real number representing the note's duration.

2. The method of claim 1, wherein tempo consisting of tempo words or number.

3. The method of claim 2, wherein words are used to describe tempo.

4. The method of claim 2, wherein number shows number of beats play in one minute.

5. The method of claim 1, wherein time signature specifies how many beats are in each measure and what note duration units constitutes one beat.

6. The method of claim 5, wherein measure is a part of musical line lies between two vertical bar lines.

7. The method of claim 5, wherein time signature is represented by a fraction number having a numerator and a denominator.

8. The method of claim 7, wherein denominator determines what note duration units constitutes one beat.

9. The method of claim 7, wherein numerator specifies how many beats are in each measure.

10. The method of claim 1, wherein key signature is a series of plus + or minus − designating notes that are consistently play one semitone higher or lower than the equivalent natural notes unless otherwise altered with a natural accidental "o".

11. The method of claim 1, wherein musical line is consisting of measures.

12. The method of claim 10, wherein a measure is consisting of music notes; sum of those notes' duration units must equal to the number of beats in each measure.

13. The method of claim 1, wherein musical line's supports are symbols or words.

14. The method of claim 1, wherein a note has two parts, part one consisting of a lower case letter preceded by a number to determine note position on musical instrument, part two is a real number followed the lower case letter to show note duration unit.

* * * * *